US006978307B2

(12) United States Patent
Goldstein

(10) Patent No.: US 6,978,307 B2
(45) Date of Patent: Dec. 20, 2005

(54) APPARATUS AND METHOD FOR PROVIDING CUSTOMER SERVICE

(75) Inventor: Tim Goldstein, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 599 days.

(21) Appl. No.: 09/909,329

(22) Filed: Jul. 19, 2001

(65) Prior Publication Data

US 2004/0015559 A1  Jan. 22, 2004

(51) Int. Cl.[7] ............................................. G06F 15/16
(52) U.S. Cl. ...................................... 709/227; 709/205
(58) Field of Search ................................ 709/220, 223, 709/227, 205, 204, 238

(56) References Cited

U.S. PATENT DOCUMENTS

| | | | |
|---|---|---|---|
| 5,361,265 A | | 11/1994 | Weinberger et al. ........ 371/29.1 |
| 5,388,252 A | * | 2/1995 | Dreste et al. ................. 714/46 |
| 5,563,805 A | | 10/1996 | Arbuckle et al. |
| 5,584,022 A | | 12/1996 | Kikuchi et al. ............. 395/609 |
| 5,884,046 A | | 3/1999 | Antonov ................ 395/200.68 |
| 6,044,403 A | * | 3/2000 | Gerszberg et al. .......... 709/225 |
| 6,046,762 A | * | 4/2000 | Sonesh et al. ........... 348/14.11 |
| 6,065,136 A | | 5/2000 | Kuwabara |
| 6,070,185 A | * | 5/2000 | Anupam et al. ............ 709/204 |
| 6,122,632 A | | 9/2000 | Botts et al. ................... 707/10 |
| 6,192,050 B1 | * | 2/2001 | Stovall ........................ 370/389 |
| 6,311,182 B1 | * | 10/2001 | Colbath et al. ................. 707/6 |

(Continued)

FOREIGN PATENT DOCUMENTS

| | | |
|---|---|---|
| EP | 0 778 529 | 6/1997 |
| EP | 1 251 467 | 10/2002 |
| GB | 2 288 100 | 10/1995 |
| GB | 2 340 608 | 2/2000 |

(Continued)

OTHER PUBLICATIONS

M2 Presswire, "VODAPHONE: Christmas Gifts and Offers at Your Vodaphone Store," Dec. 18, 2000, M2 Presswire, p. 1.*

(Continued)

Primary Examiner—Bradley Edelman

(57) ABSTRACT

An apparatus of the present invention establishes a real-time communication session with a remote communication device in order to enable a customer service representative at the remote communication device to diagnose an operational problem associated with the apparatus. The foregoing apparatus utilizes a communication interface, an input interface, and logic. The communication interface is configured to establish a real-time communication session with a remote communication device. The input interface is configured to receive a request for contacting a customer service representative and to receive input data from a user of the apparatus during the established communication session. The logic is configured to transmit, to the communication interface and in response to the request, a command signal instructing the communication interface to establish the real-time communication session. The logic is further configured to transmit, during the real-time communication session, the input data to the remote communication device via the communication interface. The apparatus is configured to perform at least one non-telephonic function, and the remote communication device is configured to interface the input data with a customer service representative, thereby assisting the customer service representative to diagnose an operation problem associated with the apparatus in performing the non-telephonic function.

27 Claims, 4 Drawing Sheets

U.S. PATENT DOCUMENTS

| | | | |
|---|---|---|---|
| 6,529,729 B1 * | 3/2003 | Nodoushani et al. | 455/419 |
| 6,542,897 B2 * | 4/2003 | Lee | 707/102 |
| 6,721,705 B2 * | 4/2004 | Kurganov et al. | 704/270.1 |
| 6,798,876 B1 * | 9/2004 | Bala | 379/265.12 |
| 2001/0040892 A1 * | 11/2001 | Spencer | 370/463 |
| 2001/0054064 A1 * | 12/2001 | Kannan | 709/203 |
| 2002/0116531 A1 * | 8/2002 | Chu | 709/246 |
| 2002/0138279 A1 * | 9/2002 | Al-Kazily et al. | 705/1 |
| 2004/0090527 A1 * | 5/2004 | Kanevsky et al. | 348/207.1 |

FOREIGN PATENT DOCUMENTS

| | | |
|---|---|---|
| GB | 2 356 271 A | 5/2001 |
| JP | 200-261834 | 9/2000 |

OTHER PUBLICATIONS

Jiji Press English News Service, "Ricoh to Launch Internet-Accessing Digital Camera," Sep. 6, 2000, Jiji Press English News Service, p. 1.*

Ricoh, RDC-i700 Image Capturing Device Brochure, from http://www.ricoh.com/r_dc/support/brochure/pdf/rdci700.pdf.*

* cited by examiner

APPARATUS AND METHOD FOR PROVIDING CUSTOMER SERVICE

BACKGROUND OF THE INVENTION

1. Field of the Invention

The present invention generally relates to data processing techniques and, in particular, to an apparatus and method for providing a real-time communication session between a customer service representative and a remote customer.

2. Related Art

Many conventional electronic devices (e.g., computers, digital cameras, DVD players, etc.) offer a wide range of functionality and are increasingly becoming more complex. Indeed, many of these devices can be complicated to operate, and users of these devices often encounter difficulties in getting the devices to behave in a desired manner. Often, the users must expend a relatively large amount of time and effort to get the devices to perform desired functionality. For example, a user may first experiment with an electric device in attempt to get the device to perform a desired function. If the user is unable to operate the device as desired, the user may then consult the device's handbook or other sources of help information provided by the manufacturer or retailer of the device. Unfortunately, locating useful information within the help sources provided by the device's manufacturer or retailer can be quite burdensome for the user.

In this regard, help information provided by the manufacturer or retailer normally includes information pertaining to a wide range of topics, and locating information on a topic of interest can be difficult and/or time consuming. In addition, it is possible that the provided help information does not pertain to the problem or problems experienced by the user. Therefore, the user is often unable or unwilling to effectively utilize the help information.

Since many users often are unable or unwilling to utilize the manufacturer's or retailer's help resources to solve difficulties encountered by the users, many manufacturers or retailers employ customer service representatives who are knowledgeable about the products sold by the manufacturer or retailer. When a user encounters a problem or a difficulty in operating a device, the user may contact one of the customer service representatives of the manufacturer or retailer in order to obtain advice. However, the contact information necessary for contacting a suitable customer service representative is not always readily available. Furthermore, even if the user locates the contact information of a customer service representative, the user is not always able to get immediate assistance. For example, the contact information of the customer representative may include the customer service representative's telephone number. However, the user may not have a telephone handy. In another example, the contact information may include the representative's e-mail address, but the user may not have immediate access to a device capable of communicating e-mail messages.

In addition, once the user has established communication with a customer service representative, the customer service representative is often not able to diagnose the user's problem or difficulty with the information provided by the user. For example, to discover the source of a problem, the customer service representative may need to investigate the present status of the device. Often, the user is unable to extract such status information from the device. As an example, the status information may be maintained within an internal register or some other memory location that the user is unable to access. In another example, the process of extracting the needed information may be too difficult for the user who, in some cases, is not very familiar with the device. Thus, in some situations, the customer service representative is unable to diagnose the user's problem until a trained technician analyzes the device. Unfortunately, a trained technician is not always readily available, and the user must either wait until a technician can meet the user or until the user can take the device to a technician.

SUMMARY OF THE INVENTION

Thus, a heretofore unaddressed need exists in the industry for providing an apparatus and method of efficiently providing a user of an electronic device with immediate and accurate help information. Generally, the present invention provides an apparatus and method for providing an efficient real-time communication session between a customer service representative and a remote customer.

In architecture, the apparatus of the present invention utilizes a communication interface, an input interface, and logic. The communication interface is configured to establish a real-time communication session with a remote communication device. The input interface is configured to receive a request for contacting a customer service representative and to receive input data from a user of the apparatus during the established communication session. The logic is configured to transmit, to the communication interface and in response to the request, a command signal instructing the communication interface to establish the real-time communication session. The logic is further configured to transmit, during the real-time communication session, the input data to the remote communication device via the communication interface. The apparatus is configured to perform at least one non-telephonic function, and the remote communication device is configured to interface the input data with a customer service representative, thereby assisting the customer service representative to diagnose an operation problem associated with the apparatus in performing the non-telephonic function.

The present invention can also be viewed as providing a method for enabling real-time communication sessions with customer service representatives. The method can be broadly conceptualized by the following steps: providing an electric apparatus, the electric apparatus configured to perform a primary function, the primary function other than enabling communication between the electric apparatus and remote communication devices; detecting, at the electric apparatus, a request for contacting a customer service representative; establishing a real-time communication session between the electric apparatus and a remote communication device in response to the detecting step; and enabling a customer service representative at the remote communication device to diagnose an operational problem associated with the electric device by transmitting data indicative of the operational problem from the electric apparatus to the remote communication device during the real-time communication session.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

The present invention generally pertains to an apparatus for enabling users to quickly and efficiently contact and provide information to a customer service representative, thereby enabling the customer service representative to diagnose and possibly correct operational errors or problems with the apparatus. In this regard, the apparatus includes a communication interface that, upon request, establishes a real-time communication session with a communication interface of a customer service representative. Thus, upon request, the user of the apparatus is able to communicate directly and in real-time with the customer service representative. As a result, the user is able to quickly and easily receive advice on the operation or configuration of the apparatus.

To enable the customer service representative to better diagnose the source of the user's problem, the apparatus may transmit, to the customer service representative, data indicative of the present state of the apparatus. The customer service representative may then utilize this data in diagnosing any problems or errors associated with the apparatus. If desired, the apparatus enables the customer service representative to control the apparatus for the purpose of obtaining diagnostic information from the apparatus and/or for correcting any operational errors or problems associated with the apparatus.

Figure 1:
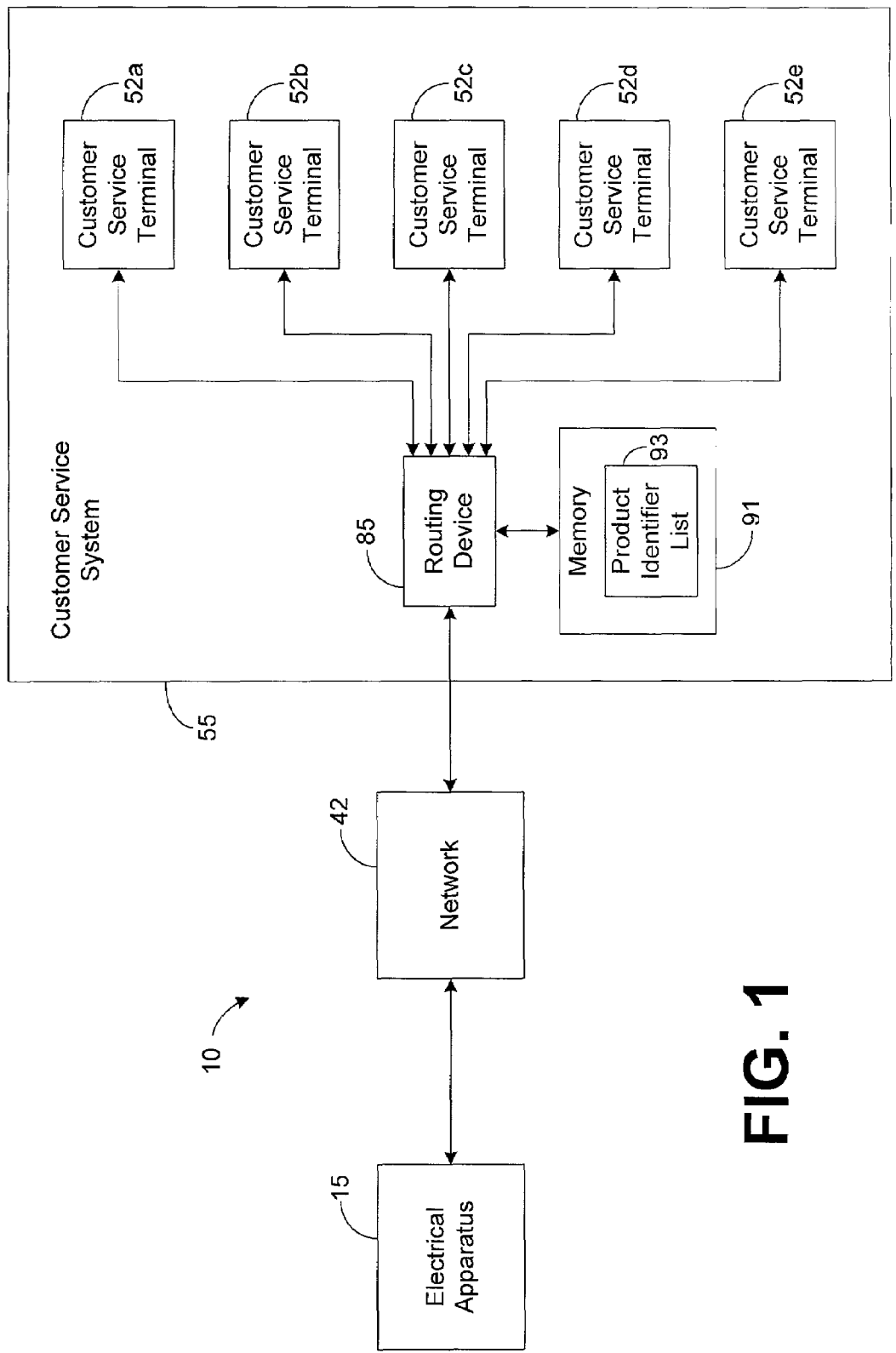
FIG. 1 is a block diagram illustrating a communication system in accordance with the present invention.

FIG. 1 depicts a communication system 10 in accordance with a preferred embodiment of the present invention. The system 10 includes a user electrical apparatus 15, which may be any type of electronic device for performing a desired function, including non-telephonic functions (i.e., functions that do not pertain specifically to the communication of messages to remote communication devices). For example, the user electrical apparatus 15 may be a computer, a digital camera, a DVD player, etc.

Figure 2:
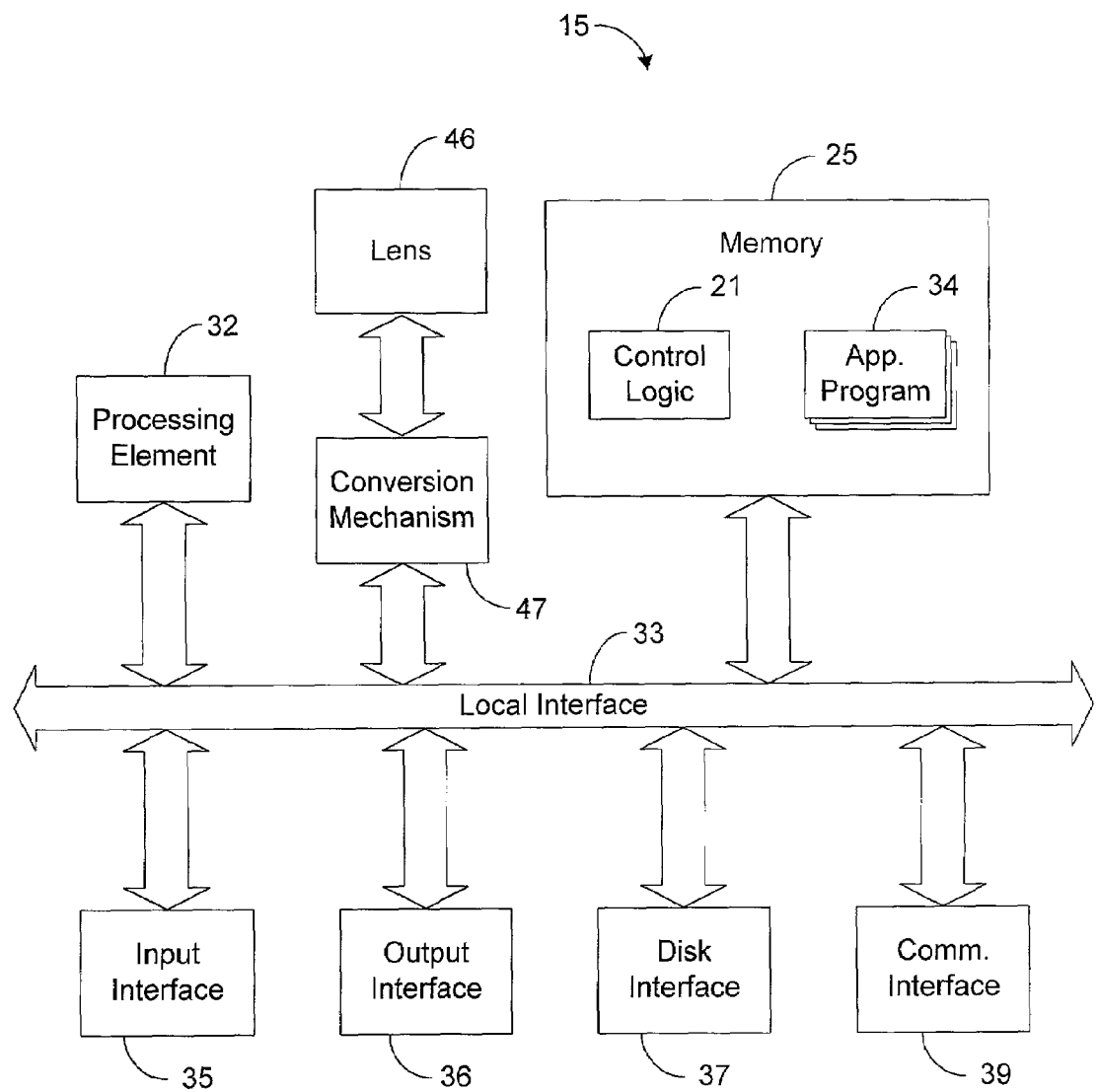
FIG. 2 is a block diagram illustrating a more detailed view of an electric apparatus depicted in FIG. 1.

FIG. 2 depicts a more detailed view of the apparatus 15. As shown by FIG. 2, the apparatus 15 includes control logic 21 that controls the operation of the apparatus 15. The control logic 21 can be implemented in software, hardware, or a combination thereof In the preferred embodiment, as illustrated by way of example in FIG. 2, the control logic 21 along with its associated methodology is implemented in software and stored in memory 25.

Note that the control logic 21, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electric, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the control logic 21 may be magnetically stored and transported on a conventional portable computer diskette.

The preferred embodiment of the apparatus 15 comprises one or more conventional processing elements 32, such as a digital signal processor (DSP) or a central processing unit (CPU), that communicate to and drive the other elements within the apparatus 15 via a local interface 33, which can include one or more buses. If desired, the control logic 21, when implemented in software, may include an operating system that controls the resources of the apparatus 15 and interfaces commands with the processing element 32 according to known techniques. The memory 25 may also include one or more application programs 34 that may be programmed to perform any desired functionality when executed by the processing element 32. The programs 34 may comprise well-known platform programs, such as Microsoft Word, Microsoft Outlook, and/or may comprise custom written programs.

The apparatus 15 may also include an input interface 35, for example, a keyboard, a keypad, a mouse, and/or other types of buttons and switches, that can be used to input data from a user of the apparatus 15. The input interface 35 may also include a microphone to enable the user to provide voice input or other types of sounds to the apparatus 15. The apparatus 15 also includes an output interface 36, for example, a screen display (e.g., a cathode ray tube or a liquid crystal display) or a printer, that can be used to output data to the user of apparatus 15. The output interface 36 may also include a speaker that allows voice data or other type of sound data to be output the user. A disk storage interface 37 can be connected to the local interface 33 to transfer data to and from a nonvolatile disk (e.g., magnetic, optical, etc.). The apparatus 15 also includes a communication interface 39 (e.g., a modem or other conventional type of transmitter/receiver) that allows the apparatus 15 to exchange data with a network 42 (FIG. 1). The interface 39 maybe wireless (e.g., cellular, optical, infrared, radio, etc.) or non-wireless, and the network 42 may be any conventional network, for example, the publicly switched telephone network (PSTN), a cellular network, and/or the Internet, that is capable of routing data according to known techniques.

The apparatus 15 may include other components to enable or assist the apparatus 15 in performing certain functions. For example, when the apparatus 15 is implemented as a camera, the apparatus 15 may include a lens 46 for receiving light and a conversion mechanism 47 for converting this light into digital data. Note that lens 46 and conversion mechanism 47 are not necessary features of the present invention and may not be included within the apparatus 15 when the apparatus 15 is implemented as another type of product.

When the user of apparatus 15 experiences difficulty in getting the apparatus 15 to behave or operate in a desired manner, it may be desirable for the user to establish communication with a customer service representative in order to receive, from the customer service representative, advice pertaining to the operation of the apparatus 15. As known in the art, a "customer service representative" is often a person who is trained, usually by the manufacturer or the retailer of the apparatus 15, to debug problems with the apparatus 15 and/or to provide advice on the operation of the apparatus 15.

Figure 3:
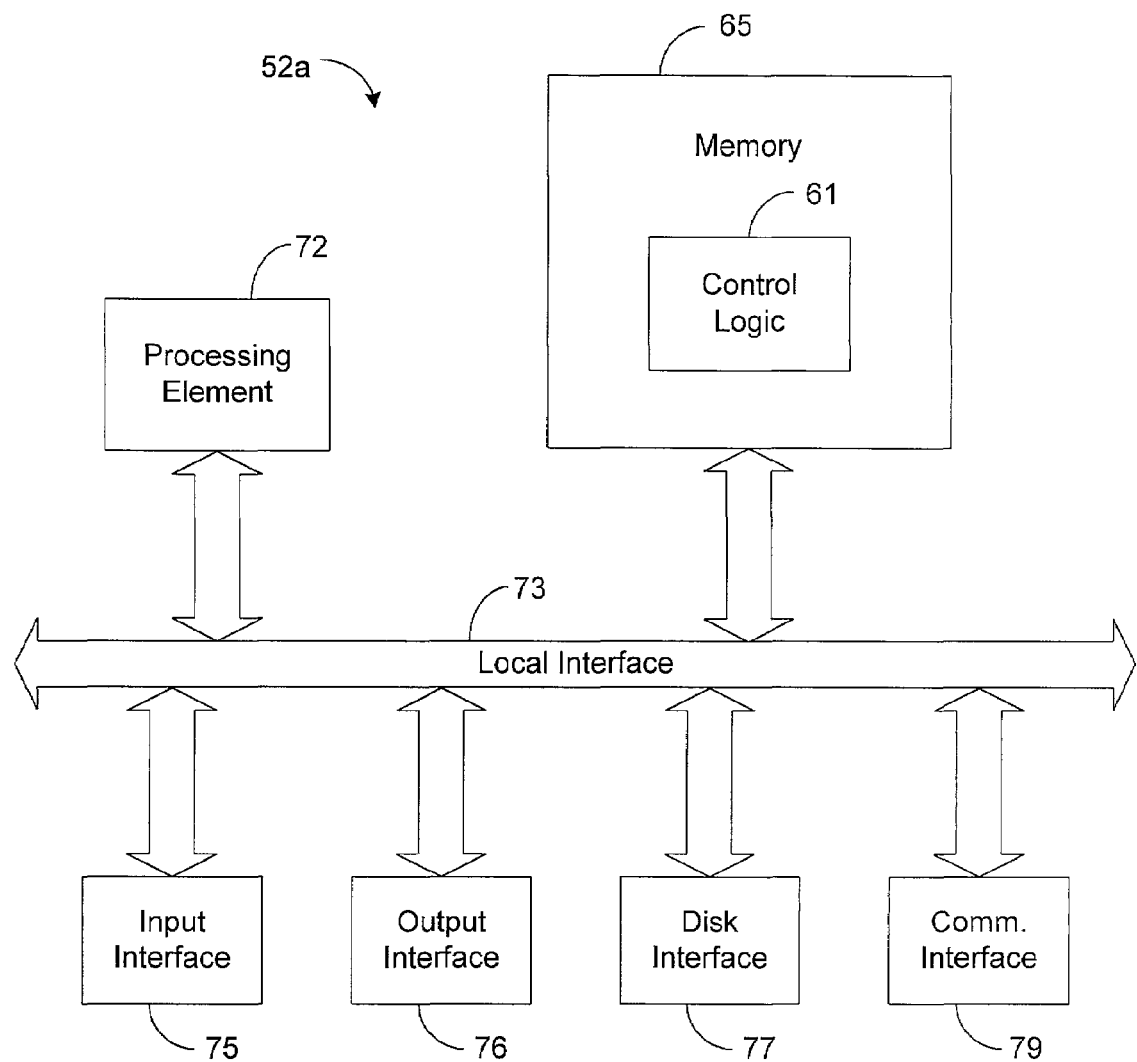
FIG. 3 is a block diagram illustrating a more detailed view of a customer service terminal depicted in FIG. 1.

To enable communication between the user and one or more customer service representatives, the system 10 includes one or more customer service terminals 52a–52e implemented within a customer service system 55, as shown by FIG. 1. Each terminal 52a–52e preferably allows at least one customer service representative to exchange data with the network 42 and, therefore, with any device (e.g., apparatus 15) communicatively coupled to the network 42. Each terminal 52a–52e may be a computer (e.g., desk-top, lap-top, hand-held, etc.), a cellular or a non-cellular telephone, or any other device capable of communicating with the network 42. Furthermore, each terminal 52a–52e may be designed similar to the apparatus 15 shown by FIG. 2. In this regard, FIG. 3 depicts a more detailed view of one of the terminals 52a of the preferred embodiment. It should be understood that each of the remaining terminals 52b–52e may be configured identical to the terminal 52a shown by FIG. 3.

As shown by FIG. 3, the terminal 52a preferably includes control logic 61 that controls the operation of the terminal 52a. The control logic 61 can be implemented in software, hardware, or a combination thereof. In the preferred embodiment, as illustrated by way of example in FIG. 3, the control logic 61 along with its associated methodology is implemented in software and stored in memory 65. Note that the control logic 61, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

The terminal 52a of FIG. 3 also comprises one or more conventional processing elements 72, such as a digital signal processor (DSP) or a central processing unit (CPU), that communicate to and drive the other elements within the terminal 52a via a local interface 73, which can include one or more buses. If desired, the control logic 61, when implemented in software, may include an operating system that controls the resources of the terminal 52a and interfaces commands with the processing element 72 according to known techniques.

The terminal 52a may also include an input interface 75, for example, a keyboard, a keypad, a mouse, and/or other types of buttons and switches, that can be used to input data from a user of the terminal 52a. The input interface 75 may also include a microphone to enable a customer service representative to provide voice input or other types of sounds to the terminal 52a. The terminal 52a also includes an output interface 76, for example, a screen display (e.g., a cathode ray tube or a liquid crystal display) or a printer, that can be used to output data to a customer service representative. The output interface 76 may also include a speaker that allows voice data or other type of sound data to be output the customer service representative. A disk storage interface 77 can be connected to the local interface 73 to transfer data to and from a nonvolatile disk (e.g., magnetic, optical, etc.). The terminal 52a also includes a communication interface 79 (e.g., a modem or other type of conventional transmitter/receiver.) that allows the terminal 52a to exchange data with the network 42 (FIG. 1). The interface 79 may be wireless (e.g., cellular or non-wireless).

When the user of the apparatus 15 would like to establish communication with a customer service representative, the user submits a request for service. There are a variety of methodologies that may be employed to submit a request for service. As used herein a "request for service" is any input provided by the user of apparatus 15 that indicates a desire to establish communication with a customer service representative. Thus, the control logic 21 is configured to cause the apparatus 15 to establish communication with one of the customer service terminals 52a–52e in response to a request for service.

As an example, the output interface 36 may display, via a display screen of output interface 36, an icon or menu item that the user may select or, in other words, activate to indicate a desire to establish communication with a customer service representative. Thus, the control logic 21 detects a request for service by detecting activation of the icon or menu item. Alternatively, the user may activate a particular set (i.e., one or more) of buttons, switches or keys within input interface 35 to indicate a desire to establish communication with a customer service representative. Therefore, the control logic 21 detects a request for service by detecting activation of the particular set of buttons, switches or keys. In another embodiment, the control logic 21 may include voice recognition logic that is capable of interpreting verbal commands from the user. Thus, the user may indicate a desire to establish communication with a customer service representative by speaking a particular command into a microphone within input interface 35. In this embodiment, the control logic 21 detects a request for service by detecting whether the microphone of input interface 35 has detected the particular verbal command. Other well-known techniques exist for providing inputs into electrical devices, and any of these techniques may be employed for submitting a request for service.

When the control logic 21 determines that the user of apparatus 15 has submitted a request for service, the control logic 21 instructs the communication interface 39 to transmit a data message. The message preferably includes a destination identifier associated with the customer service terminals 52a–52e or routing device 85 such that the message is ultimately routed to one of the terminals 52a–52e, as will be described in more detail hereinafter. The destination identifier may be an internet protocol (IP) destination address, a telephone number, and/or any other type of information typically used by network 42 to route messages. Based on the destination identifier, the network 42 routes the message to a routing device 85, which interfaces the message with one of the customer service terminals 52a–52e. The operation of the routing device 85 will be described in more detail hereinbelow.

In the preferred embodiment, the control logic 21 also includes in the foregoing message a product identifier that identifies a type of product implemented by the apparatus 15. In this regard, most products are assigned a model number that can be analyzed to identify the product. For example, a user of a digital camera can provide the camera's model number to a customer service representative who precisely identifies the type of camera at issue based on the model number provided by the user. Thus, by receiving the model number from the user, the customer service representative may be aware of the exact configuration of the camera.

The product identifier included in the message transmitted by the apparatus 15 may be the model number of the apparatus 15 or may be any other type of information that allows a customer service representative to identify the apparatus 15 or a component of the apparatus 15. The routing device 85 may be configured to utilize the product identifier transmitted from apparatus 15 in routing the message to one of the terminals 52a–52e. In this regard, a particular set (i.e., one or more) of the terminals 52a–52e may be used by customer service representatives who are more familiar (relative to other customer service representatives) with the configuration of the apparatus 15 or of a component identified by the product identifier. Therefore, the routing device 85 may be configured to ensure that the message from the apparatus 15 is routed to one of the terminals 52a–52e that is included in the particular set. In other words, the routing device 85, based on the product identifier transmitted from the apparatus 15, may be configured to ensure that the message from the apparatus 15 is routed to a terminal 52a–52e that is used by a customer service representative who is relatively familiar with the design of the apparatus 15 or of the component identified by the product identifier.

To achieve the foregoing, the routing device 85 may maintain in memory 91 a list 93, herein referred to as the "product identifier list," that correlates each possible product identifier with one or more terminals 52a–52e. Each terminal 52a–52e correlated with a particular product identifier is preferably used by a customer service representative who is relatively familiar with the product identified by the product identifier. Thus, upon receiving the aforementioned message from apparatus 15, the routing device 85 transmits the message to one of the customer service terminals 52a–52e correlated by the list 93 with the product identifier included in the message. As a result, the message should be automatically transmitted to one of the terminals 52a–52e being used by a customer service representative that is familiar with the apparatus 15 or with the component identified by the product identifier. Note that other methodologies may be employed to correlate a product identifier with one of the terminals 52a–52e without utilizing a product identifier list 93.

As an example, assume that the apparatus 15 is executing or running a particular application 34 (e.g., Microsoft Word, Microsoft Outlook, etc.) when the user submits a request for service. In such a circumstance, it may be assumed that the user has submitted a request for service due to a difficulty or problem in getting the particular application 34 to behave as expected or desired. Thus, in transmitting a message in response to the request for service, the control logic 21 may be configured to include, in the message, a product identifier that identifies the particular application 34 (i.e., the application 34 running at the time of the request for service). The routing device 85, based on the foregoing product identifier, may then route the message to a terminal 52a–52e used by a customer service representative who is familiar with the particular application 34. As a result, the message is automatically transmitted to a terminal 52a–52e that is utilized by a customer service representative who is likely to be well suited for handling the problem encountered by the user of the apparatus 15.

Alternatively, the product identifier may identify the type and/or model of apparatus 15. In such an example, the routing device 85 may route the message from the apparatus 15 to a terminal 52a–52e used by a customer service representative who is familiar with the type and/or model of apparatus 15. Thus, the customer service representative who responds to the foregoing message is likely to be well suited for handling the problem encountered by the user of the apparatus 15. For illustrative purposes, assume hereafter that the routing device 85 transmits the foregoing message to terminal 52a.

The terminal 52a that receives the message transmitted from the apparatus 15 notifies the terminal's customer service representative of the received message. For example, the terminal 52a may display or otherwise convey a message via output interface 76 notifying the customer service representative that the user of the apparatus 15 has requested the services of a customer service representative. In response, the customer service representative may reply with a greeting or some other type of message. In the preferred embodiment, the customer service representative communicates a voice message to the user's apparatus 15, although other types of messages may be transmitted in other embodiments. As an example, the customer service representative may speak a greeting to the user of the apparatus 15 and ask the user to describe the problem that he or she is having with the apparatus 15. A microphone of the input interface 75 converts the customer service representative's speech into voice data, and the terminal 52a then transmits the voice data over the network 42 to the apparatus 15. One or more speakers of the output interface 36 then converts the voice data into sound and conveys the sound to the user of the apparatus 15. Thus, the user should hear the customer service representative's greeting and request for more information.

By implementing the aforedescribed functionality, the user of the apparatus 15 may be provided with a quick response to his or her request for service. In the preferred embodiment, the messages communicated between the apparatus 15 and the terminal 52a are transmitted within a real-time communication session between the apparatus 15 and the terminal 52a. In such a real-time communication session, inputs from the user of apparatus 15 are transmitted to the terminal 52a and, upon receipt by the terminal 52a, are immediately and automatically communicated to the customer service representative, and inputs from the customer representative are transmitted to the apparatus 15 and, upon receipt by the apparatus 15, are immediately and automatically communicated to the user of apparatus 15. Communicating in a real-time data communication session allows the customer service representative to obtain sufficient information for diagnosing operational problems of the apparatus 15 in an expedient and efficient manner.

As an example, the user (in response to the customer service representative's greeting and request for more information) can verbally describe the problem that he or she is having with the apparatus 15, and a microphone of the input interface 35 can convert the user's speech into voice data. This voice data can be communicated to the customer service terminal 52a, which immediately and automatically reproduces the user's speech for the customer service representative. While the user is explaining his or her problem, the customer service representative, via techniques previously described, can communicate verbal questions to the user in order to help the user to provide the necessary information for enabling the customer service representative to diagnose the user's problem.

Since a real-time communication session is quickly and easily established between the user of the apparatus 15 and a customer service representative in response to a submission of a request for service, the user's burden of obtaining help information is reduced as compared to conventional methodologies for obtaining help information, and the user is, therefore, more likely to utilize the help services provided by the present invention. Consequently, the user is likely to be more satisfied with the apparatus 15, thereby providing a competitive advantage to the manufacturer or retailer of the apparatus 15.

There are a variety of communication methodologies that may be employed to enable the apparatus 15 and the terminal 52a to exchange data, as described above. For example, the apparatus 15 and the terminal 52a may exchange data via internet protocol (IP). In such an embodiment, the apparatus 15 is associated with an IP address, and the routing device 85 is associated with another IP address. Both of the foregoing IP addresses are stored in the memory 25 of the apparatus 15. Each message transmitted from the apparatus 15 includes the IP address of the routing device 85, and the network 42 utilizes this address, via conventional techniques, to route the message to the routing device 85. The routing device 85 then interfaces the message with the appropriate terminal 52a, as described above.

Each message transmitted from the apparatus 15 also includes the IP address of the apparatus 15. The terminal 52a preferably utilizes this address to transmit messages to the apparatus 15. More specifically, the terminal 52a includes the IP address of the apparatus 15 in each message transmitted from the terminal 52a such that the network 42, via conventional techniques, routes each such message to the apparatus 15. As a result, communication between the apparatus and the terminal 52a is enabled.

In another embodiment, a conventional telephony link may be established between the apparatus 15 and the terminal 52a. In such an embodiment, the apparatus 15 initially provides the network 42 with a destination identifier (e.g., telephone number) associated with the routing device 85. The network 85, via conventional techniques, then provides a dedicated end-to-end telephony connection between the routing device 85 and the apparatus 15. Portions of this end-to-end telephony connection may be conductive (e.g., copper) wires, fiber optic cables, wireless (e.g., cellular), etc. Any message transmitted by the apparatus 15 is routed to the routing device 85 via the foregoing end-to-end connection, and any message transmitted by the terminal 52a is routed to the apparatus 15 via the foregoing end-to-end connection. Communication between the apparatus 15 and the terminal 52a continues in this manner until the communication session is terminated. Note that other suitable methodologies may be employed for enabling communication between the apparatus 15 and the terminal 52a without departing from the principles of the present invention.

It should be noted that the real-time communication session between the user of the apparatus 15 and the customer service representative of terminal 52a should not be limited to the voice communication described hereinabove. For example, it is possible to communicate textual data between the apparatus 15 and terminal 52a within a real-time communication session. In this regard, the apparatus 15 and the terminal 52a may exchange textual data that is displayed via pop-up windows. Thus, when communication is established between the apparatus 15 and the terminal 52a, the output interface 36 of apparatus 15 displays a window, and each textual character received from the terminal 52a is displayed within this window. Further, the output interface 76 of terminal 52a displays a window, and each textual character received from the apparatus 15 is displayed within this window. Thus, the user of the apparatus 15 and the customer service representative of terminal 52a may exchange textual messages instead of voice messages within a real-time communication session. Note that the textual characters may be typed via input interface 35 or 75 or may be generated via voice recognition logic. Furthermore, there may be various other suitable methodologies for exchanging textual data within a real-time communication session, and such methodologies may be employed to exchange data between the apparatus 15 and the terminal 52a.

To further assist the customer service representative in diagnosing the problem with the apparatus 15, the control logic 21 of the apparatus 15 may be configured to transmit, to the terminal 52a, certain diagnostic information to help the customer service representative to diagnose the source of the problem. As used herein, "diagnostic information" refers to any information that a customer service representative may utilize in diagnosing operational errors or problems associated with apparatus 15. Such information may include, but is not limited to, register values, memory values, output values (e.g., values rendered by output interface 36), etc. Such values may be transmitted by the apparatus 15 to the terminal 52a and displayed to the customer service representative via output interface 76.

As an example, the output interface 35 of the apparatus 15 may include a display screen that is rendering an image (e.g., a window), and it may be useful for the customer service representative to view this same image. Thus, the control logic 21 may be configured to transmit, to the terminal 52a, the same graphical data that defines the foregoing image so that the terminal 52a can render this image to the customer service representative. In another example, it may be useful for the customer service representative to view data hidden from the user, such as, but not limited to, the values of control registers and flags. Such data is typically indicative of the device's present status or state and is sometimes referred to as a device's "machine state." The control logic 21 may be configured to retrieve this type of data and to transmit the retrieved data to the terminal 52a, which displays the data to the customer service representative.

In providing the terminal 52a with certain diagnostic information, as described above, the control logic 21 may be configured to automatically transmit portions of this diagnostic information each time a request for service is detected. The control logic 21 may also be configured to transmit portions of this data upon request by either the user or the customer service representative. Furthermore, the control logic 21 may be configured to respond to commands transmitted from the terminal 52a just as if the commands were entered by the user of the apparatus 15. Therefore, the customer service representative may control which information is transmitted from the apparatus 15 to the terminal 52a, thereby enabling the customer service representative to search for or locate information of interest to the customer service representative. Furthermore, if the customer service representative diagnoses the source of the problem, it is possible for the customer service representative to change the state of the apparatus 15 in order to correct the problem.

As an example, the customer service representative may discover that a setting (e.g., a control value) of the apparatus 15 could be changed in order to correct the operational problem of the apparatus 15. In such a situation, the customer service representative, via input interface 75, may submit a command to change the foregoing setting, and the terminal 52a may transmit this command to apparatus 15. In response to the command, the control logic 21 preferably modifies the setting, thereby improving the performance or operation of the apparatus 15. The user may provide feedback to the customer service representative, via the established communication session between apparatus 15 and terminal 52a, as to whether the operation of the apparatus 15 has improved once the setting has been changed.

The customer service representative may also test the operation of the apparatus 15 by submitting an input and viewing the outputs of the apparatus 15 in order to determine whether the apparatus 15 is responding as expected. In such a situation, the customer service representative enters an input via input interface 75, and the terminal 52a transmits this input to apparatus 15. The control logic 21 then processes this input just as if the input had been entered via input interface 35. If the control logic 21 normally provides an output to such an input, then the control logic 21 is preferably configured to transmit this output to terminal 52a.

For example, assume that the control logic 21 normally displays a data message via output interface 36 in response to a particular input. If the terminal 52a transmits this input to the apparatus 15, then the control logic 21 may be configured to transmit the foregoing message to the terminal 52a in addition to or in lieu of transmitting the message to output interface 36. The terminal 52a then displays the message via output interface 76. Thus, the customer service representative is able to determine whether the apparatus 15 has responded correctly to the input previously transmitted to the apparatus 15.

OPERATION

The preferred use and operation of the system 10 and associated methodology are described hereafter.

Figure 4:
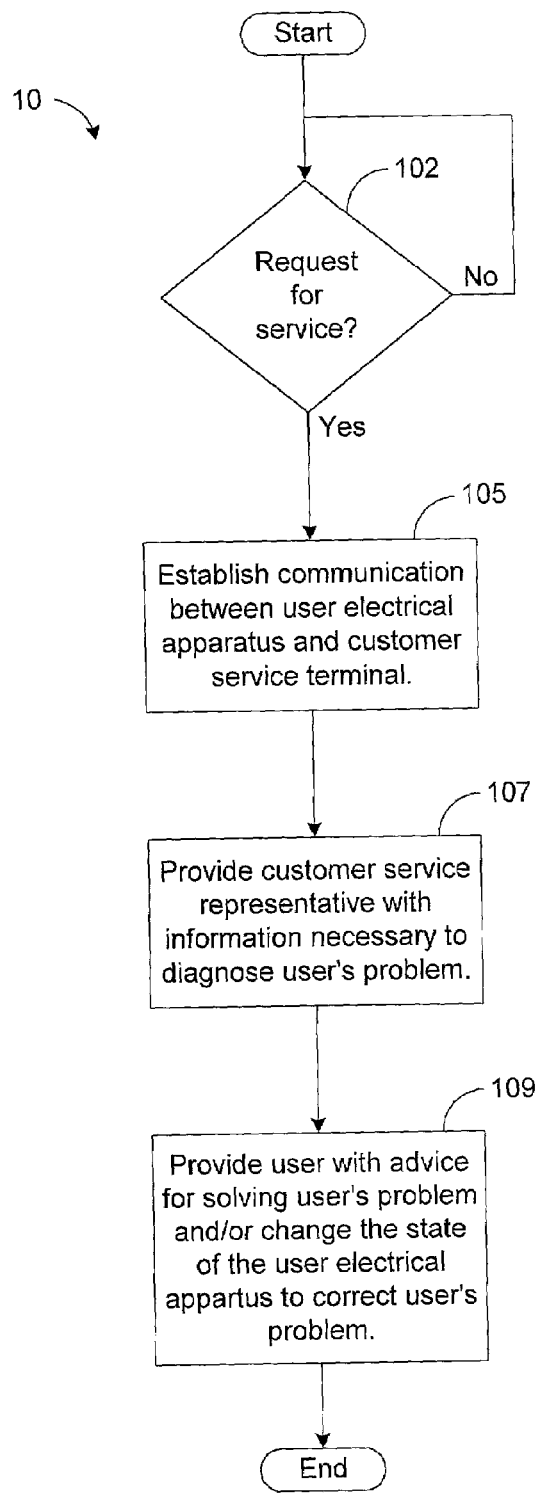
FIG. 4 is a flow chart illustrating the operation of the system depicted in FIG. 1.

For the purposes of illustration, assume that the apparatus 15 is a digital camera (i.e., the primary function of the apparatus 15 is to take pictures) and that the user of the apparatus 15 has taken a picture, which did not turn out as expected. In this example, the picture is defined by graphical data stored in the camera, and the output interface 36 of the camera may include a liquid crystal display that renders an image of the picture based on the foregoing graphical data. Upon viewing the picture image, the user may be dissatisfied with the coloring or lighting of the image. Thus, the user submits a request for service, which is detected in block 102 of FIG. 4. In response, the control logic 21 causes the apparatus 15 to establish a real-time communication session between the apparatus 15 and one of the terminals 52a–52e, as depicted by block 105.

More specifically, the control logic 21 transmits a message via communication interface 39, which may be a cellular transmitter/receiver, for example, to network 42, which routes the message to routing device 85. The control logic 21 preferably includes, in the message, a product identifier that identifies the apparatus 15 as a digital camera of a particular model. Based on the product identifier, the routing device 85 routes the message to a customer service terminal 52a being used by a customer service representative who is familiar with the apparatus 15. The terminal 52a then notifies the customer service representative that it has received a message in response to a submission of a request for service by a remote user.

In response to the foregoing notification, the customer service representative preferably speaks to the user, inquiring as to any problems that user is having. In this regard, the customer service representative speaks into a microphone of input interface 75, and the terminal 52a converts this speech into voice data and transmits the voice data to apparatus 15. The apparatus 15 then converts this voice data into sound so that the user of the apparatus 15 can hear the greeting and questions spoken by the customer service representative. In block 107, the user then explains, to the customer service representative, the problem that he or she is having with the apparatus 15. More specifically, the user explains that he or she has taken a picture that did not turn out as expected. The user's speech is converted into voice data by the apparatus 15 and transmitted to the terminal 52a, which replays the user's speech to the customer service representative. The user of apparatus 15 and the customer service representative may converse, as described above, as often as needed in order for the customer service representative to diagnose the problem.

To help the customer service representative diagnose the source of the problem, it may be desirable for customer service representative to obtain diagnostic information from the apparatus 15 in block 107. More specifically, in the present example, it may be desirable for the customer service representative to see the picture at issue and the control settings of the apparatus 15 that control the picture's coloring. Therefore, either the user or the customer service representative may provide a command instructing the apparatus 15 to transmit, to the terminal 52a, the graphical data defining the picture as well as data indicative of the foregoing control settings. The user may submit such a command via input interface 35, and the customer service representative may submit such a command via input interface 75. If the command is submitted by the customer service representative, then the terminal 52a transmits the command to the apparatus 15 via network 42.

In response to the foregoing command, the apparatus 15 transmits the requested graphical data and control settings over network 42 to the terminal 52a, which renders the graphical data and the control settings. Upon seeing the picture and the control settings, the customer service representative may decide that the picture would appear more desirable to the user, if the control settings were changed. Thus, the customer service representative may communicate, via apparatus 15, network 42, and terminal 52a, a suggestion to the user of the apparatus 15 instructing the user to change the control settings of the apparatus 15 in a particular way.

Alternatively, the customer service representative may input a command for changing the control settings of the apparatus 15. The terminal 52a communicates this command over network 42 to apparatus 15, and in response, the control logic 21 preferably changes the settings of the apparatus 15 as commanded by the customer service representative, thereby changing the appearance of the picture. In such an embodiment, the user of the apparatus 15 may communicate, to the customer service representative, whether or not the changes improve the picture's appearance. Once the user is satisfied with the service provided by the customer service representative, the communication session between the user of apparatus 15 and the customer service representative may be terminated.

It should be noted that it is not necessary for the apparatus 15 to be implemented as a digital camera and that a similar methodology may be employed when the apparatus 15 is implemented as another type of device. Furthermore, it should be apparent to one skilled in the art that other types of real-time communication sessions may be established between the user and the customer service representative. In particular, it is not necessary for the user and the customer service representative to communicate via voice data, and other forms of communication may be employed.

What is claimed is:

1. An apparatus for communicating to customer service representatives in real-time, comprising:
   a communication interface configured to establish a real-time communication session with a remote communication device in response to a user request for contacting a customer service representative;
   an input interface configured to receive input data from a user of said apparatus during said established communication session; and
   logic configured to transmit, during said real-time communication session, said input data to said remote communication device via said communication interface, said logic further configured to automatically retrieve a product identifier in response to said user request and to transmit said retrieved product identifier to a remote routing device, said product identifier identifying at least a component of said apparatus,
   wherein said remote routing device is configured to route said input data to said remote communication deviced based on said product identifier, and wherein said remote communication device is configured to interface said input data with a customer service representative, thereby assisting said customer service representative to diagnose an operational problem associated with said apparatus.

2. The apparatus of claim 1, wherein said input data is voice data, and wherein said input interface includes a microphone configured to detect the user's speech and to convert said speech into said voice data.

3. The apparatus of claim 1, wherein said logic is configured to retrieve predefined contact information from memory within said apparatus in response to said request, said contact information sufficient for enabling said communication interface to establish said communication session with said remote communication device, said logic configured to provide said contact information to said communication interface in response to said request, wherein said communication interface is configured to utilize said contact information to establish said communication session.

4. The apparatus of claim 1, further comprising:
   a lens; and
   a conversion mechanism configured to convert light received by said lens into digital data.

5. The apparatus of claim 1, wherein said routing device is configured to select said remote communication device and to communicatively couple said remote communication device to said communication interface based on said product identifier.

6. The apparatus of claim 1, wherein said logic is further configured to retrieve data from memory within said apparatus and to transmit said retrieved data to said remote communication device via said communication interface during said real-time communication session, said retrieved data indicative of an operational state of said apparatus, wherein said remote communication device is configured to interface said retrieved data with said customer service representative thereby assisting said customer service representative to diagnose said operational problem based on said retrieved data.

7. The apparatus of claim 6, wherein said logic is configured to transmit said retrieved data to said remote communication device in response to a request transmitted from said remote communication device.

8. The apparatus of claim 6, wherein said logic is configured to change said operational state based on commands received from said remote communication device.

9. The apparatus of claim 1, wherein said logic is configured to automatically select said product identifier for transmission to said routing device based on whether said component is being used when said user request is received by said apparatus.

10. A method, comprising:
    detecting, at an electric apparatus, a request for contacting a customer service representative;
    storing a product identifier in said electrical apparatus prior to said detecting, said product identifier identifying at least a component of said electrical apparatus;
    establishing a real-time communication session between said electric apparatus and a remote communication device in response to said detecting;
    enabling a customer service representative at said remote communication device to diagnose an operational problem associated with said electrical apparatus by transmitting data indicative of said operational problem from said electric apparatus to said remote communication device during said real-time communication session; and
    automatically transmitting said stored product identifier from said electrical apparatus to a routing device in response to said detecting thereby causing said routing device to route said data to said remote communication device.

11. The method of claim 10, wherein said data is voice data.

12. The method of claim 10, wherein said electric apparatus includes a lens, said method further comprising capturing an image via said lens.

13. The method of claim 10, further comprising:
    retrieving data from memory within said electric apparatus, said retrieved data indicative of an operational state of said electric apparatus; and
    transmitting said retrieved data from said electric apparatus to said remote communication device during said communication session.

14. The method of claim 13, wherein said transmitting is performed in response to a command transmitted from said remote communication device.

15. The method of claim 13, further comprising changing said operational state based on a command transmitted from said remote communication device to said electric apparatus.

16. The method of claim 13, further comprising displaying an image of said retrieved data via said remote communication device.

17. The method of claim 13, further comprising diagnosing said operational problem based on said retrieved data and said data indicative of said operational problem.

18. The method of claim 10, wherein said component comprises an aplication for performing at least one task, said method further comprising:
    determining that said application is running when said request is detected by said detecting; and
    selecting said product identifier based on said determining.

19. A method, comprising:
    detecting, at an electrical apparatus, a request for contacting a customer service representative;
    storing a product identifier in said electrical apparatus, said product identifier identifying at least a component of said electrical apparatus;

selecting a remote communication device based on said product identifier;

establishing, based on said selecting, a real-time communication session between said electric apparatus and said remote communication device in response to said detecting;

inputting data to said electric apparatus during said communication session; and transmitting said input data to said remote communication device during said communication session, thereby enabling a customer service representative at said remote communication device to diagnose, based on said input data, an operational problem associated with said electrical apparatus.

20. The method of claim 19, wherein said input data is voice data and wherein said inputting includes:

detecting speech at said electric apparatus; and converting said speech into said voice data.

21. The method of claim 19, wherein said electric apparatus includes a lens and wherein said method further comprises:

receiving light via said lens; and converting said light into digital data.

22. The method of claim 19, further comprising:

retrieving data from memory within said electric apparatus, said retrieved data indicative of an operational state of said electric apparatus; and transmitting said retrieved data from said electric apparatus to said remote communication device during said communication session, thereby enabling said customer service representative at said remote communication device to diagnose, based on said retrieved data, said operational problem.

23. The method of claim 22, further comprising modifying said operational state of said electric apparatus based on a command transmitted from said remote communication device to said electric apparatus.

24. The method of claim 19, further comprising:

determining that said component is being used when said request is detected by said detecting; and selecting said product identifier based on said determining.

25. A method for communicating with customer service representatives, comprising:

storing, at an electrical apparatus, a product identifier identifying at least a component of said electrical apparatus;

receiving, at said electrical apparatus, a user request for contacting a customer service representative;

automatically retrieving said product identifer in response to said user request;

transmitting, from said electrical apparatus, data indicative of an operational problem associated with said electrical apparatus; and automatically routing said data to a remote communication device based on said product identifier retrieved by said retrieving.

26. The method of claim 25, further comprising:

determining whether said component is being used by a user of said electrical apparatus when said user request is received by said receiving; and automatically selecting said product identifier based on said determining, wherein said routing is based on said selecting.

27. The method of claim 25, further comprising:

determining whether an application is running on said electrical apparatus when said user request is received by said receiving; and automatically selecting said product identifier based on said determining, wherein said routing is based on said selecting.

* * * * *

UNITED STATES PATENT AND TRADEMARK OFFICE
CERTIFICATE OF CORRECTION

PATENT NO.        : 6,978,307 B2
APPLICATION NO. : 09/909329
DATED             : December 20, 2005
INVENTOR(S)       : Tim Goldstein It is certified that error appears in the above-identified patent and that said Letters Patent is hereby corrected as shown below:

In column 13, line 21, in Claim 1, delete "deviced" and insert -- device --, therefor.

In column 14, line 10, in Claim 10, delete "electric" and insert -- electrical --, therefor.

In column 14, line 16, in Claim 10, delete "electric" and insert -- electrical --, therefor.

In column 14, line 22, in Claim 10, delete "electric" and insert -- electrical --, therefor.

In column 14, line 32, in Claim 12, delete "electric" and insert -- electrical --, therefor.

In column 14, line 36, in Claim 13, delete "electric" and insert -- electrical --, therefor.

In column 14, line 38, in Claim 13, delete "electric" and insert -- electrical --, therefor.

In column 14, line 39, in Claim 13, delete "electric" and insert -- electrical --, therefor.

In column 14, line 47, in Claim 15, delete "electric" and insert -- electrical --, therefor.

In column 14, line 56, in Claim 18, delete "aplication" and insert -- application --, therefor.

In column 15, line 4, in Claim 19, delete "electric" and insert -- electrical --, therefor.

In column 15, line 7, in Claim 19, delete "electric" and insert -- electrical --, therefor.

In column 15, line 17, in Claim 20, delete "electric" and insert -- electrical --, therefor.

In column 15, line 19, in Claim 21, delete "electric" and insert -- electrical --, therefor.

In column 15, line 25, in Claim 22, delete "electric" and insert -- electrical --, therefor.

In column 15, line 27, in Claim 22, delete "electric" and insert -- electrical --, therefor.

In column 15, line 28, in Claim 22, delete "electric" and insert -- electrical --, therefor.

UNITED STATES PATENT AND TRADEMARK OFFICE
CERTIFICATE OF CORRECTION

PATENT NO. : 6,978,307 B2
APPLICATION NO. : 09/909329
DATED : December 20, 2005
INVENTOR(S) : Tim Goldstein It is certified that error appears in the above-identified patent and that said Letters Patent is hereby corrected as shown below:

In column 15, line 35, in Claim 23, delete "electric" and insert -- electrical --, therefor.

In column 15, line 37, in Claim 23, delete "electric" and insert -- electrical --, therefor.

In column 16, line 13, in Claim 25, delete "identifer" and insert -- identifier --, therefor.

Signed and Sealed this

Eleventh Day of August, 2009

David J. Kappos
*Director of the United States Patent and Trademark Office*